(No Model.)
P. WHITE.
URINAL.
No. 432,465. Patented July 15, 1890.
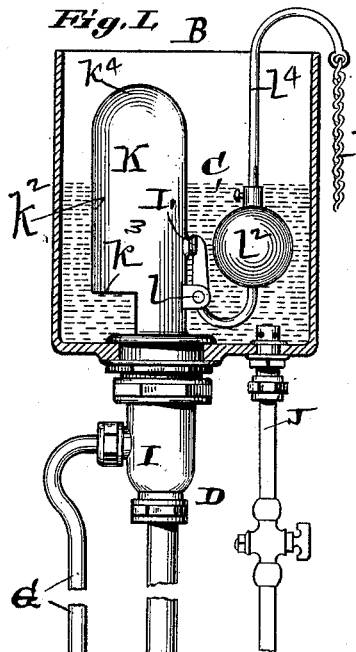
Fig. 1.
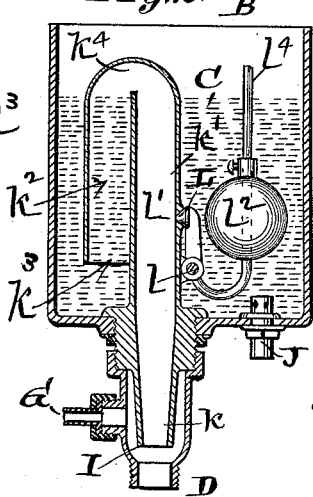
Fig. 2.
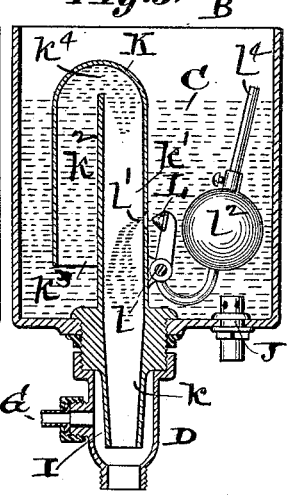
Fig. 3.
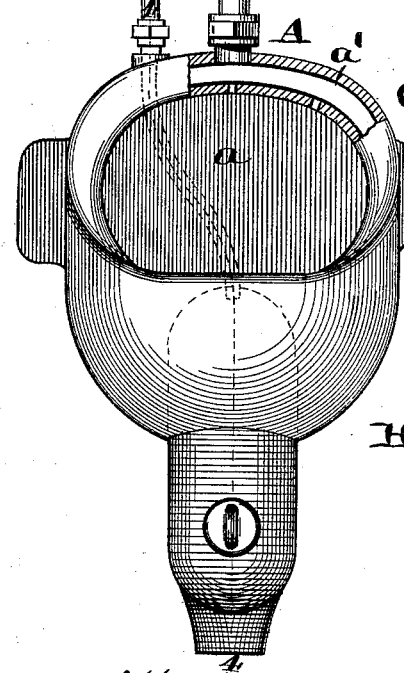
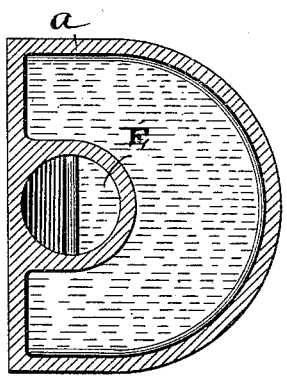
Fig. 4. Fig. 5.
Attest:
Inventor:
Peter White
by C. D. Moody
his atty

UNITED STATES PATENT OFFICE.

PETER WHITE, OF ST. LOUIS, MISSOURI.

URINAL.

SPECIFICATION forming part of Letters Patent No. 432,465, dated July 15, 1890.

Application filed January 31, 1890. Serial No. 338,776. (No model.)

*To all whom it may concern:*

Be it known that I, PETER WHITE, of St. Louis, Missouri, have made a new and useful Improvement in Urinals, of which the following is a full, clear, and exact description.

The improvement has relation more especially to tank-urinals, in which siphonic mechanism is employed in delivering the water of the tank to the urinal; and it consists in the improved means for "breaking" the siphon, substantially as is hereinafter set forth and claimed, aided by the annexed drawings, making part of this specification, in which—

Figure 1 is a view of the improved construction. The tank is shown in vertical section and the remaining portion of the construction in front elevation, saving that a portion of the urinal-bowl is broken away to exhibit the water-passages; Fig. 2, a vertical section of the tank and the siphon. The ball-valve used in breaking the siphon is in elevation and shown closed; Fig. 3, a view similar to that of Fig. 2, the ball-valve shown open; Fig. 4, a vertical section on the line 4 4 of Fig. 1, and Fig. 5 a horizontal section on the line 5 5 of Fig. 4.

The same letters of reference denote the same parts.

A represents the urinal, which is of the usual construction, saving as it is modified by the improvement under consideration.

B represents the tank from which the water C is supplied to the urinal-bowl $a$. The water flows from the tank into the discharge-pipe D and thence into the bowl $a$, passing first into the bowl-passages $a'$ and ultimately into the bowl.

E represents the upper trap in the urinal and F the lower trap.

G represents the pipe leading from the chamber H, between the traps, upward to connect with the pipe D in the usual manner, substantially as shown at I, to constitute an ejector of the usual character. The water is supplied to the tank through some suitable supply-pipe, such as shown at J.

K represents a siphon connected at its lower end $k$ with the ejector I and leading thence upward at $k'$ into the tank to the level at which the water stands therein, and then turning downward at $k^2$ toward the bottom of the tank and having its end $k^3$ open to admit the water from the tank.

The water may be supplied to the tank in any of the well-known or usual methods, and the water flows, when the siphon is slanted from the tank upward, into the siphon K, and then downward therein into the pipe D, passing the ejector I, and then entering the bowl $a$. As it thus flows past the ejector-nozzle $i$ the usual vacuum is formed in the chamber H, and the contents of the urinal-bowl are removed by siphonic action and discharged into the outlet-pipe $a^2$.

The means employed for breaking the vacuum in the siphon K before the water in the tank drops to the level of the end $k^3$ of the siphon is a leading feature of the improved construction.

L represents a ball-valve pivoted at $l$ to some bearing, such as shown, and adapted to seat and close an opening at $l'$ in the siphon K in the part $k'$ thereof above the level of the end $k^3$, substantially as shown.

The various parts of the ball-valve are contrived, substantially as shown, so that as the water wells upward in the tank the ball $l^2$ of the valve is thereby lifted and the valve thereby seated, and as the water falls in the tank the ball drops and the valve thereby unseated. The ball-valve, by means such as the chain $l^3$, applied to an extension $l^4$ of the valve-lever $l^5$, is also adapted to be unseated irrespective of the stage of water in the tank.

In operation, suppose by means of a pull upon the chain $l^3$ or otherwise the valve is unseated when the water is standing in the tank above the level of the opening $l'$—say as indicated in Fig. 3—and after a momentary pull upon the chain the valve is released. The valve at first unseats, as stated, and the water commences to flow from the tank through the opening $l'$ into the part $k'$ of the siphon K. This described flow operates to start another flow of water from the tank upward into the part $k^2$ of the siphon K, and thence over into the descending part $k'$, whereupon the ejector I is started into operation. When the pull upon the chain ceases before the water has fallen sufficiently in the tank to allow the ball $l^2$ to drop, the ball at once rises and the valve seats, as shown in Fig. 1. The water, however, although prevented from entering the siphon K through the opening $l'$, continues to flow into the siphon K through the part $k^2$ thereof, and thence to the ejector I, and this continues until the water has fallen in the tank below the level of the opening $l'$ sufficiently to enable the ball to drop and effect the unseating of the valve L, whereupon the siphon is at once broken by the entrance of air through the opening $l'$, and the water ceases to flow from the tank. The water flowing into the tank again lifts the ball and causes the valve to seat automatically. The siphon K serves also for an overflow-pipe.

By any means (not shown) the water is kept from rising above a certain level in the tank—say not above the level of the top of the partition which separates the parts $k'$ $k^2$ of the passage K—but should the water rise to cause the water to well upward in the part $k^2$ to flow over into the part $k'$ the siphonage of the water from the tank is initiated and maintained until the water is lowered in the tank sufficiently to effect the unseating of the valve, whereupon the siphon is again broken automatically.

The herein-described tank mechanism is illustrated in connection with a urinal. It can, however, be used in connection with various forms of water-closets in which siphon mechanism is used.

I claim—

1. In combination with the tank having the water-inlet, the water-outlet, and the siphon $k'$ $k^2$, as described, the herein-described ball-valve and its seat, said valve-seat being arranged in the descending part of said siphon at a level above the inlet to the ascending part of said siphon and above the level to which the water drops when the tank is siphoned, but below the level at which the water stands in the tank prior to the siphoning of the tank, and the valve-lever, ball and pivot being arranged and extended to enable the valve, in case its lever is released, immediately after the siphoning is initiated, to seat automatically, and when seated to be unseated automatically by the water falling in the tank, substantially as described.

2. The combination, with a urinal or water-closet having an ejector I, of the tank, the inlet, the siphon K, having the parts $k'$ $k^2$ and valve-seat and the ball-valve, said ball-valve and valve-seat, together with the lever and pivot of said ball-valve, being relatively constructed and arranged to cause said valve to seat before the water rises in said tank to the level of said valve-seat, substantially as described.

Witness my hand this 25th day of January, 1890.

PETER WHITE.

Witnesses:
C. D. MOODY,
D. W. E. SANFORD.